United States Patent
Houston et al.

(10) Patent No.: US 6,940,040 B2
(45) Date of Patent: Sep. 6, 2005

(54) ELECTRIC ARC WELDING SYSTEM

(75) Inventors: William S. Houston, Avon, OH (US); Russell K. Myers, Hudson, OH (US); Elliott K. Stava, Sagamore Hills, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/933,659

(22) Filed: Sep. 3, 2004

(65) Prior Publication Data

US 2005/0023253 A1 Feb. 3, 2005

Related U.S. Application Data

(63) Continuation of application No. 10/702,278, filed on Nov. 6, 2003, which is a continuation of application No. 10/236,836, filed on Sep. 6, 2002, now Pat. No. 6,660,966, which is a continuation of application No. 09/835,972, filed on Apr. 17, 2001, now Pat. No. 6,472,634.

(51) Int. Cl.[7] .................................................. B23K 9/09
(52) U.S. Cl. ............................ 219/130.51; 219/137 PS
(58) Field of Search ........................ 219/130.5, 130.51, 219/130.21, 130.31, 130.32, 130.33, 137 PS, 130.1

(56) References Cited

U.S. PATENT DOCUMENTS

| | | |
|---|---|---|
| 3,458,797 A | 7/1969 | Larsen |
| 4,503,316 A | 3/1985 | Murase et al. |
| 6,051,810 A | 4/2000 | Stava |
| 6,111,216 A | 8/2000 | Stava |
| 6,207,929 B1 | 3/2001 | Stava et al. |
| 6,291,798 B1 | 9/2001 | Stava |
| 6,365,874 B1 | 4/2002 | Stava |
| 6,466,469 B1 | 10/2002 | Caruthers et al. |

Primary Examiner—Clifford C. Shaw
(74) Attorney, Agent, or Firm—Fay, Sharpe, Fagan, Minnich & McKee, LLP

(57) ABSTRACT

An electric arc welding system for creating an AC welding arc between an electrode and a workpiece wherein the system comprises a first controller for a first power supply to cause the first power supply to create an AC current between the electrode and workpiece by generating a switch signal or command with polarity reversing switching points in the first controller, with the first controller operated at first welding parameters in response to first power supply specific parameter signals to the first controller. The system has at least one slave controller for operating a slave power supply to create an AC current between the electrode and workpiece by reversing polarity of the AC current at switching points where the slave controller is operated at second welding parameters in response to second power supply specific parameter signals to the slave controller. An information network connected to the first controller and the slave controller and containing digital first and second power supply specific parameter signals for the first controller and the slave controller and a digital interface connects the first controller with the slave controller to control the switching points of said second power supply by the switch signal or command from the first controller.

39 Claims, 8 Drawing Sheets

ABSTRACT# ELECTRIC ARC WELDING SYSTEM

This is application a continuation of pending U.S. application Ser. No. 10/702,278, filed on Nov. 6, 2003, which is a continuation of U.S. application Ser. No. 10/236,836 now U.S. Pat. No. 6,660,966, filed on Sep. 6, 2002, which is a continuation of U.S. application Ser. No. 09/835,972 now U.S. Pat. No. 6,472,634, filed on Apr. 17, 2001, each of which are incorporated herein by reference and owned by Assignee of this application.

INCORPORATION BY REFERENCE

INCORPORATION BY REFERENCE

The present invention is directed to an electric arc welding system utilizing high capacity alternating circuit power supplies for driving two or more tandem electrodes of the type used in seam welding of large metal blanks. Although the invention can be used with any standard AC power supply with switches for changing the output polarity, it is preferred that the power supplies use the switching concept disclosed in Stava U.S. Pat. No. 6,111,216 wherein the power supply is an inverter having two large output polarity switches with the arc current being reduced before the switches reverse the polarity. Consequently, the term "switching point" is a complex procedure whereby the power supply is first turned off awaiting a current less than a preselected value, such as 100 amperes. Upon reaching the 100 ampere threshold, the output switches of the power supply are reversed to reverse the polarity from the D.C. output link of the inverter. Thus, the "switching point" is an off output command, known as a "kill" command, to the power supply inverter followed by a switching command to reverse the output polarity. The kill output can be a drop to a decreased current level. This procedure is duplicated at each successive polarity reversal so the AC power supply reverses polarity only at a low current. In this manner, snubbing circuits for the output polarity controlling switches are reduced in size or eliminated. Since this switching concept is preferred to define the switching points as used in the present invention, Stava U.S. Pat. No. 6,111,216 is incorporated by reference. The concept of an AC current for tandem electrodes is well known in the art. Prior application Ser. No. 09/336,804 filed Jun. 12, 1999 discloses a system whereby tandem electrodes are each powered by a separate inverter type power supply. The frequency is varied to reduce the interference between alternating current in the adjacent tandem electrodes. Indeed, this application relates to single power sources for driving either a DC powered electrode followed by an AC electrode or two or more AC driven electrodes. In each instance, a separate inverter type power supply is used for each electrode and, in the alternating current high capacity power supplies, the switching point concept of Stava U.S. Pat. No. 6,111,216 is employed. This system for separately driving each of the tandem electrodes by a separate high capacity power supply is background information to the present invention and is incorporated herein as such background. In a like manner, U.S. application Ser. No. 09/406,406 filed Sep. 27, 1999 discloses a further arc welding system wherein each electrode in a tandem welding operation is driven by two or more independent power supplies connected in parallel with a single electrode arc. The system involves a single set of switches having two or more accurately balanced power supplies forming the input to the polarity reversing switch network operated in accordance with Stava U.S. Pat. No. 6,111,216. Each of the power supplies is driven by a single command signal and, therefore, shares the identical current value combined and directed through the polarity reversing switches. This type system requires large polarity reversing switches since all of the current to the electrode is passed through a single set of switches. This application does show a master and slave combination of power supplies for a single electrode and discloses general background information to which the invention is directed. For that reason, this application is also incorporated by reference.

BACKGROUND OF INVENTION

Welding applications, such as pipe welding, often require high currents and use several arcs created by tandem electrodes. Such welding systems are quite prone to certain inconsistencies caused by arc disturbances due to magnetic interaction between two adjacent tandem electrodes. A system for correcting the disadvantages caused by adjacent AC driven tandem electrodes is disclosed in prior application Ser. No. 09/336,804 filed Jun. 21, 1999 by assignee of this invention. In that prior application, each of the AC driven electrodes has its own inverter based power supply. The output frequency of each power supply is varied so as to prevent magnetic interference between adjacent electrodes. This system requires a separate power supply for each electrode. As the current demand for a given electrode exceeds the current rating of the inverter based power supply, a new power supply must be designed, engineered and manufactured. Thus, such system for operating tandem welding electrodes require high capacity or high rated power supplies to obtain high current as required for pipe welding. To decrease the need for special high current rated power supplies for tandem operated electrodes, assignee developed the system disclosed in application Ser. No. 09/406,406 wherein each AC electrode is driven by two or more inverter power supplies connected in parallel. These parallel power supplies have their output current combined at the input side of a polarity switching network. Thus, as higher currents are required for a given electrode, two or more parallel power supplies are used. In this system, each of the power supplies are operated in unison and share equally the output current. Thus, the current required by changes in the welding conditions can be provided only by the over current rating of a single unit. A current balanced system did allow for the combination of several smaller power supplies; however, the power supplies had to be connected in parallel on the input side of the polarity reversing switching network. As such, large switches were required for each electrode. Consequently, such system overcame the disadvantage of requiring special power supplies for each electrode in a tandem welding operation of the type used in pipe welding; but, there is still the disadvantage that the switches must be quite large and the input, paralleled power supplies must be accurately matched by being driven from a single current command signal. This prior application does utilize the concept of a synchronizing signal for each welding cell directing current to each tandem electrode. However, the system still required large switches. This type of system was available for operation in an ethernet network interconnecting the welding cells. In ethernet interconnections, the timing cannot be accurately controlled. In the system described, the switch timing for a given electrode need only be shifted on a time basis, but need not be accurately identified for a specific time. Thus, the described system requiring balancing the current and a single switch network has been the manner of obtaining high capacity current for use in tandem arc welding operations when using an ethernet network or an internet and ethernet control system. There is a desire to control welders by an ethernet network, with or without an internet link. Due to timing limitation, these networks dictated use of tandem electrode systems of the type using only general synchronizing techniques.

THE INVENTION

It is advantageous in high current systems for arc welding to drive one electrode with several paralleled inverter type power supplies while accommodating network control. The disadvantage has been that such systems required the current to be accurately balanced and required a single high capacity output switching network. Such systems could be controlled by a network; however, the parameter to each paralleled power supply could not be varied. Each of the cells could only be offset from each other by a synchronizing signal. Such systems were not suitable for central control by the internet and/or local area network control because an elaborate network to merely provide offset between cells was not advantageous.

The present invention utilizes the concept of a single AC arc welding cell for each electrode wherein the cell itself includes one or more paralleled power supplies each of which has its own switching network. The output of the switching network is then combined to drive the electrode. This allows the use of relatively small switches for polarity reversing of the individual power supplies paralleled in the system. In addition, relatively small power supplies can be paralleled to build a high current input to each of several electrodes used in a tandem welding operation. The use of several independently controlled power supplies paralleled after the polarity switch network for driving a single electrode allows advantageous use of a network, such as the internet or ethernet.

In accordance with the invention, smaller power supplies in each system are connected in parallel to power a single electrode. By coordinating switching points of each paralleled power supply with a high accuracy interface, the AC output current is the sum of currents from the paralleled power supplies without combination before the polarity switches. By using this concept, the ethernet network, with or without an internet link, can control the weld parameters of each paralleled power supply of the welding system. The timing of the switch points is accurately controlled by the novel interface, whereas the weld parameters directed to the controller for each power supply can be provided by an ethernet network which has no accurate time basis. Thus, an internet link can be used to direct parameters to the individual power supply controllers of the welding system for driving a single electrode. There is no need for a time based accuracy of these weld parameters coded for each power supply. In the preferred implementation, the switch point is a "kill" command awaiting detection of a current drop below a minimum threshold, such as 100 amperes. When each power supply has a switch command, then they switch. The switch points between parallel power supplies, whether instantaneous or a sequence involving a "kill" command with a wait delay, are coordinated accurately by an interface card having an accuracy of less than 10 $\mu$s and preferably in the range of 1–5 $\mu$s. This timing accuracy coordinates and matches the switching operation in the paralleled power supplies to coordinate the AC output current.

By using the internet or ethernet local area network, the set of weld parameters for each power supply is available on a less accurate information network, to which the controllers for the paralleled power supplies are interconnected with a high accuracy digital interface card. Thus, the switching of the individual, paralleled power supplies of the system is coordinated. This is an advantage allowing use of the internet and local area network control of a welding system. The information network includes synchronizing signals for initiating several arc welding systems connected to several electrodes in a tandem welding operation in a selected phase relationship. Each of the welding systems of an electrode has individual switch points accurately controlled while the systems are shifted or delayed to prevent magnetic interference between different electrodes. This allows driving of several AC electrodes using a common information network. The invention is especially useful for paralleled power supplies to power a given electrode with AC current. The switch points are coordinated by an accurate interface and the weld parameter for each paralleled power supply is provided by the general information network. This network can also operate a DC electrode which does not require the interconnected switching points used in the present invention.

In accordance with the present invention, there is provided an electric arc welding system for creating an AC welding arc between the electrode and workpiece. As will be explained, the system can drive one electrode by a single inverter. As a feature of the system, two or more power supplies can drive a single electrode. Thus, the system comprises a first controller for a first power supply to cause the first power supply to create an AC current between the electrode and workpiece by generating a switch signal with polarity reversing switching points in general timed relationship with respect to a given system synchronizing signal received by the first controller. This first controller is operated at first welding parameters in response to a set of first power supply specific parameter signals directed to the first controller. There is provided at least one slave controller for operating the slave power supply to create an AC current between the same electrode and workpiece by reversing polarity of the AC current at switching points. The slave controller operates at second weld parameters in response to the second set of power supply specific parameter signals to the slave controller. An information network connected to the first controller and the second or slave controller contains digital first and second power supply specific parameter signals for the two controllers and the system specific synchronizing signal. Thus, the controllers receive the parameter signals and the synchronizing signal from the information network, which may be an ethernet network with or without an internet link, or merely a local area network. The invention involves a digital interface connecting the first controller and the slave controller to control the switching points of the second or slave power supply by the switch signal from the first or master controller. In practice, the first controller starts a current reversal at a switch point. This event is transmitted at high accuracy to the slave controller to start its current reversal process. When each controller senses an arc current less than a given number, a "ready signal" is created. After a "ready" signal from all paralleled power supplies, all power supplies reverse polarity. This occurs upon receipt of a strobe or look command each 25 $\mu$s. Thus, the switching is in unison and has a delay of less than 25 $\mu$s. Consequently, both of the controllers have interconnected data controlling the switching points of the AC current to the single electrode. The same controllers receive parameter information and a synchronizing signal from an information network which in practice comprises a combination of internet and ethernet or a local area ethernet network. In accordance with the invention, the timing accuracy of the digital interface is less than about 10 $\mu$s and, preferably, in the general range of 1–5 µs. Thus, the switching points for the two controllers driving a single electrode are commanded within less than 5 µs. Then, switching actually occurs within 25 µs. At the same time, relatively less time sensitive information is received from the information network also connected to the two controllers driving the AC current to a single electrode in a tandem welding operation. The 25 µs maximum delay can be changed, but is less than the switch command accuracy.

In accordance with another aspect of the present invention there is provided an electrical arc welding system for creating an AC welding arc between an electrode and workpiece. The system comprises a first power supply to create a first AC current with first weld parameters between the electrode and workpiece by generating a first switch controlling signal reversing polarity of the first current at a specific switch time. A second power supply is provided to create a second AC current with second weld parameters between the same electrode and workpiece by a second switch controlling signal reversing polarity of the second current at a switch time coordinated with the specific switch time of the first power supply. The invention involves a timing interface between the first and second power supplies to create the second switch reversing signal by the first switch reversing signal where the switch signals are 10 µs and preferably less than 5 µs of the specific switch time. Consequently, the paralleled individually switched power supplies are coordinated by accurately matching the switch reversing times. The master controller has a switch command signal synchronized with a phase signal. The command signal is transmitted rapidly by the digital interface to the controller of the paralleled power supply. The second power supply then processes its switch point. In one embodiment, these switch points cause the reversal of polarity. Preferably, these switch points merely cause the inverters to be "killed" so they decrease the currents by a time constant curve. When both currents are reduced below a given amount, the paralleled power supplies switch.

In the invention, the interconnected controllers have a polarity logic indicating the polarity of the two output currents. This merely assures that the two power supplies are switched with matching polarities. In this manner, the controller of the first power supply tells the controller of the second power supply which polarity is being reversed. The polarity logic is not a part of the invention although it is used in implementing the invention. The accuracy of the switching commands is the critical aspect of the digital high speed interconnecting interface between controllers that are otherwise controlled by an information network, such as an ethernet network with or without an internet link.

In accordance with still a further aspect of the invention, an electric arc welding system is provided for creating a first AC welding arc between a first weld electrode and a workpiece and a second AC welding arc between a second weld electrode and the sane workpiece as the first and second electrodes move along the workpiece. This is the definition of a tandem mounted welding operation. The invention also comprises a system including a first cell with at least two power supplies connected to the first arc and operated at a first synchronized time determined by a first synchronized signal with first weld parameters and a high accuracy interconnection interface between the power supplies of the first cell to correlate polarity switching of the power supplies in the first cell. There is also provided a second cell with at least two power supplies connected to the second arc and operated at a second synchronized time determined by a second synchronized signal offset from the first synchronized signal with second weld parameters and a high accuracy interconnection interface between the power supplies of the second cell to correlate polarity switching of the power supplies of the second cell. A low accuracy information network, such as an internet link connected to a local area network, is connected to the first and second cells and contains digital signals including the first and second weld parameters and digitized first and second synchronizing signals. In this manner, the paralleled power supplies of each cell are interconnected by a high accuracy interface whereas the several controllers are operated with signals in the information network that are not time sensitive.

In one aspect of the invention, a power supply system for creating a first AC signal and a second AC signal is provided. In one embodiment, the power supply system includes: a first system withat least two power supplies operated at a first synchronized time determined by a first synchronized signal with first operation parameters and a high accuracy interconnection interface between said power supplies of said first system to correlate polarity switching of said power supplies of said first system and a second system with at least two power supplies operated at a second synchronized time determined by a second synchronize signal offset from said first synchronize signal with second operation parameters and a high accuracy interconnection interface between said power supplies of said second system to correlate polarity switching of said power supplies of said second system. In this embodiment, each power supply includes: a center tapped inductor with a first portion creating a first polarity where said corresponding AC signal is positive and a second portion creating a second polarity where said corresponding AC signal is negative, a first switch for routing said corresponding AC signal through said first portion of said inductor, and a second switch for routing said corresponding AC signal through said second portion of said inductor.

In another embodiment, the power supply system includes: a first system with at least two power supplies operated at a first synchronized time determined by a first synchronized signal with first operation parameters and a high accuracy interconnection interface between said power supplies of said first system to correlate polarity switching of said power supplies of said first system and a second system with at least two power supplies operated at a second synchronized time determined by a second synchronize signal offset from said first synchronize signal with second operation parameters and a high accuracy interconnection interface between said power supplies of said second system to correlate polarity switching of said power supplies of said second system. In this embodiment, each power supply includes an output switching network. The output switching network includes: a first switch in series with a first inductor segment creating a first polarity associated with said corresponding AC signal that is positive when said first switch is turned on, a second switch in series with a second inductor segment creating a second polarity associated with said corresponding AC signal that is negative when said second switch is turned on, and control means for alternately turning said first switch on and said second switch off at a first switch reversing point and turning said second switch on and said first switch off at a second switch reversing point to create the corresponding AC signal.

In another aspect of the invention, a power supply system is provided. In one embodiment, the power supply system includes: a first controller for a first power supply to cause said first power supply to create an AC current by generating a switch signal with polarity reversing switching points in a general timed relationship with respect to a given system specific synchronizing signal to said first controller, said first controller operated at first parameters in response to first power supply specific parameter signals to said first controller and at least one slave controllerfor operating a slave power supply to create an AC current by reversing polarity of said AC current at switching points, said slave controller operated at second parameters in response to second power supply specific parameter signals to said slave controller. In this embodiment, the first power supply and each slave power supply include: a center tapped inductor with a first portion creating a first polarity where said corresponding AC current is positive and a second portion creating a second polarity where said corresponding AC current is negative, a first switch for muting said corresponding AC current through said first portion of said inductor, and a second switch for routing said corresponding AC current through said second portion of said inductor.

In another embodiment, the power supply system includes: a first controller for a first power supply to cause said first power supply to create an AC current by generating a switch signal with polarity reversing switching points in a general timed relationship with respect to a given system specific synchronizing signal to said first controller, said first controller operated at first parameters in response to first power supply specific parameter signals to said first controller and at least one. slave controller for operating a slave power supply to create an AC current by reversing polarity of said AC current at switching points, said slave controller operated at second parameters in response to second power supply specific parameter signals to said slave controller. In this embodiment, the first powersupply and each slave power supply include an output switching network. The output switching network includes: a first switch in series with a first inductor segment creating a first polarity associated with said corresponding AC current that is positive when said first switch is turned on, a second switch in series with a second inductor segment creating a second polarity associated with said corresponding AC current that is negative when said second switch is turned on, and control means for alternately turning said first switch on and said second switch off at a first switch reversing point and turning said second switch on and said first switch off at a second switch reversing point to create the corresponding AC current.

In still another embodiment, the power supply system includes: at least a first power supply for delivering a first low frequency current and a second power supply for delivering a second low frequency current. In this embodiment, each of said power supplies include: a three phase voltage input operated at line frequency, a rectifier to convert said input voltage to a DC voltage link and a high frequency switching type inverter converting said DC voltage link to a high frequency AC current, an output rectifier circuit to provide a positive voltage terminal and a negative voltage terminal, and an output switching network operated at a given low frequency for directing a pulsating current at said given low frequency from said terminals. The output switching network includes: a center tapped inductor with a first portion creating a first polarity where said corresponding pulsating current is positive and a second portion creating a second polarity where said corresponding pulsating current is negative, a first switch for routing said corresponding pulsating current through said first portion of said inductor, and a second switch for routing said corresponding pulsating current through said second portion of said inductor.

In yet another embodiment, the power supply system includes: at least a first power supply for delivering a first low frequency current and a second power supply for delivering a second low frequency current. In this embodiment, each of said power supplies include: a three phase voltage input operated at line frequency, a rectifier to convert said input voltage to a DC voltage link and a high frequency switching type inverter converting said DC voltage link to a high frequency AC current, an output rectifier circuit to provide a positive voltage terminal and a negative voltage terminal, and an output switching network operated at a given low frequency for directing a pulsating current at said given low frequency from said terminals. The output switching network includes: a first switch in series with a first inductor segment creating a first polarity associated with said corresponding pulsating current that is positive when said first switch is turned on, a second switch in series with a second inductor segment creating a second polarity associated with said corresponding pulsating current that is negative when said second switch is turned on, and control means for alternately turning said first switch on and said second switch off at a first switch reversing point and turning said second switch on and said first switch off at a second switch reversing point to create the corresponding pulsating current.

In still another aspect of the invention, an electric arc welding system for creating an AC welding arc between an electrode and a workpiece is provided. In one embodiment, the electric arc welding system includes: a first power supply to create a first AC current with first weld parameters between said electrode and workpiece by generating a first switch controlling signal reversing polarity of said first current at a specific switch time and a second power supply to create a second AC current with second weld parameters between said electrode and workpiece by a second switch controlling signal reversing polarity of said second current at a switch time near said specific switch time. In this embodiment, the first and second power supplies each include: a center tapped inductor with a first portion creating a first polarity where said corresponding AC current is positive and a second portion creating a second polarity where said corresponding AC current is negative, a first switch for routing said corresponding AC current through said first portion of said inductor, and a second switch for routing said corresponding AC current through said second portion of said inductor.

In another embodiment, the electric arc welding system includes: a first power supply to create a first AC current with first weld parameters between said electrode and workpiece by generating a first switch controlling signal reversing polarity of said first current at a specific switch time and a second power supply to create a second AC current with second weld parameters between said electrode and workpiece by a second switch controlling signal reversing polarity of said second current at a switch time near said specific switch time. In this embodiment, the first and second power supplies each include an output switching network. The output switching network includes: a first switch in series with a first inductor segment creating a first polarity associated with said corresponding AC current that is positive when said first switch is turned on, a second switch in series with a second inductor segment creating a second polarity associated with said corresponding AC current that is negative when said second switch is turned on, and control means for alternately turning said first switch on and said second switch off at a first switch reversing point and tuming said second switch on and said first switch off at a second switch reversing point to create the corresponding AC current.

In still another embodiment, the electric arc welding system includes: a first power supply to create a first AC current with first weld parameters between said electrode and workpiece by generating a first switch signal for reversing polarity of said first current at a specific time and a second power supply to create a second AC current with second weld parameters between said electrode and workpiece by a second switch signal for reversing polarity of said second current at a given time. In this embodiment, the first and second power supplies each include: a center tapped inductor with a first portion creating a first polarity where said corresponding AC current is positive and a second portion creating a second polarity where said corresponding AC current is negative, a first switch for routing said corresponding AC current through said first portion of said inductor, and a second switch for routing said corresponding AC current through said second portion of said inductor.

In yet another embodiment, the electric arc welding system includes: a first power supply to create a first AC current with first weld parameters between said electrode and workpiece by generating a first switch signal for reversing polarity of said first current at a specific time and a second power supply to create a second AC current with second weld parameters between said electrode and workpiece by a second switch signal for reversing polarity of said second current at a given time. In this embodiment, the first and second power supplies each include an output switching network. The output switching network includes: a first switch in series with a first inductor segment creating a first polarity associated with said corresponding AC current that is positive when said first switch is turned on, a second switch in series with a second inductor segment creating a second polarity associated with said corresponding AC current that is negative when said second switch is turned on, and control means for alternately turning said first switch on and said second switch off at a, first switch reversing point and turning said second switch on and said first switch off at a second switch reversing point to create the corresponding AC current.

In yet still another embodiment, the electric arc welding system includes: a first power supply to create a first AC current with first weld parameters between said electrode and workpiece by generating a first switch controlling signal reversing polarity of said first current at a specific active switch time and a second power supply to create a second AC current with second weld parameters between said electrode and workpiece by a second switch controlling signal reversing polarity of said second current at a switch activate time. In this embodiment, the first and second power supplies each include: a center tapped inductor with a first portion creating a first polarity where said corresponding AC current is positive and a second portion creating a second polarity where said corresponding AC current is negative, a first switch for routing said corresponding AC current through said first portion of said inductor, and a second switch for routing said corresponding AC current through said second portion of said inductor.

In another embodiment, the electric arc welding system includes: a first power supply to create a first AC current with first weld parameters between said electrode and workpiece by generating a first switch controlling signal reversing polarity of said first current at a specific active switch time and a second power supply to create a second AC current with second weld parameters between said electrode and workpiece by a second switch controlling signal reversing polarity of said second current at a switch activate time. In this embodiment, the first and second power supplies each include an output switching network. The output switching network includes: a first switch in series with a first inductor segment creating a first polarity associated with said corresponding AC current that is positive when said first switch is turned on, a second switch in series with a second inductor segment creating a second polarity associated with said corresponding AC current that is negative when said second switch is turned on, and control means for alternately turning said first switch on and said second switch off at a first switch reversing point and turning said second switch on and said first switch off at a second switch reversing point to create the corresponding AC current. In yet another aspect of the invention, an electric welder is provided. In one embodiment, the electric welder includes: a first power source with a first 6 output polarity changing switch network creating a first AC output with first output leads connected across an electrode and a workpiece and a second power source with a second output polarity changing switch network creating a second AC output with second output leads connected across said electrode and workpiece in parallel with said first leads. In this embodiment, the first and second output polarity changing switch networks each include: a center tapped inductor with a first portion creating a first polarity where said corresponding AC output is positive and a second portion creating a second polarity where said corresponding AC output is negative, a first switch for routing said corresponding AC output through said first portion of said inductor, and a second switch for routing said corresponding AC output through said second portion of said inductor.

In another embodiment, the electric welder includes: a first power source with a first output polarity changing switch network creating a first AC output with first output leads connected across an electrode and a workpiece and a second power source with a second output polarity changing switch network creating a second AC output with second output leads connected across said electrode and workpiece in parallel with said first leads. In this embodiment, the first and second output polarity changing switch networks each include: a first switch in series with a first inductor segment creating a first polarity associated with said corresponding AC output that is positive when said first switch is turned on, a second switch in series with a second inductor segment creating a second polarity associated with said corresponding AC output that is negative when said second switch is turned on, and control means for alternately turning said first switch on and said second switch off at a first switch reversing point and turning said second switch on and said first switch off at a second switch reversing point to create the corresponding AC output.

These and other objects and advantages will become apparent from the following description taken together with the accompanying drawings.

PREFERRED EMBODIMENT

Figure 1:
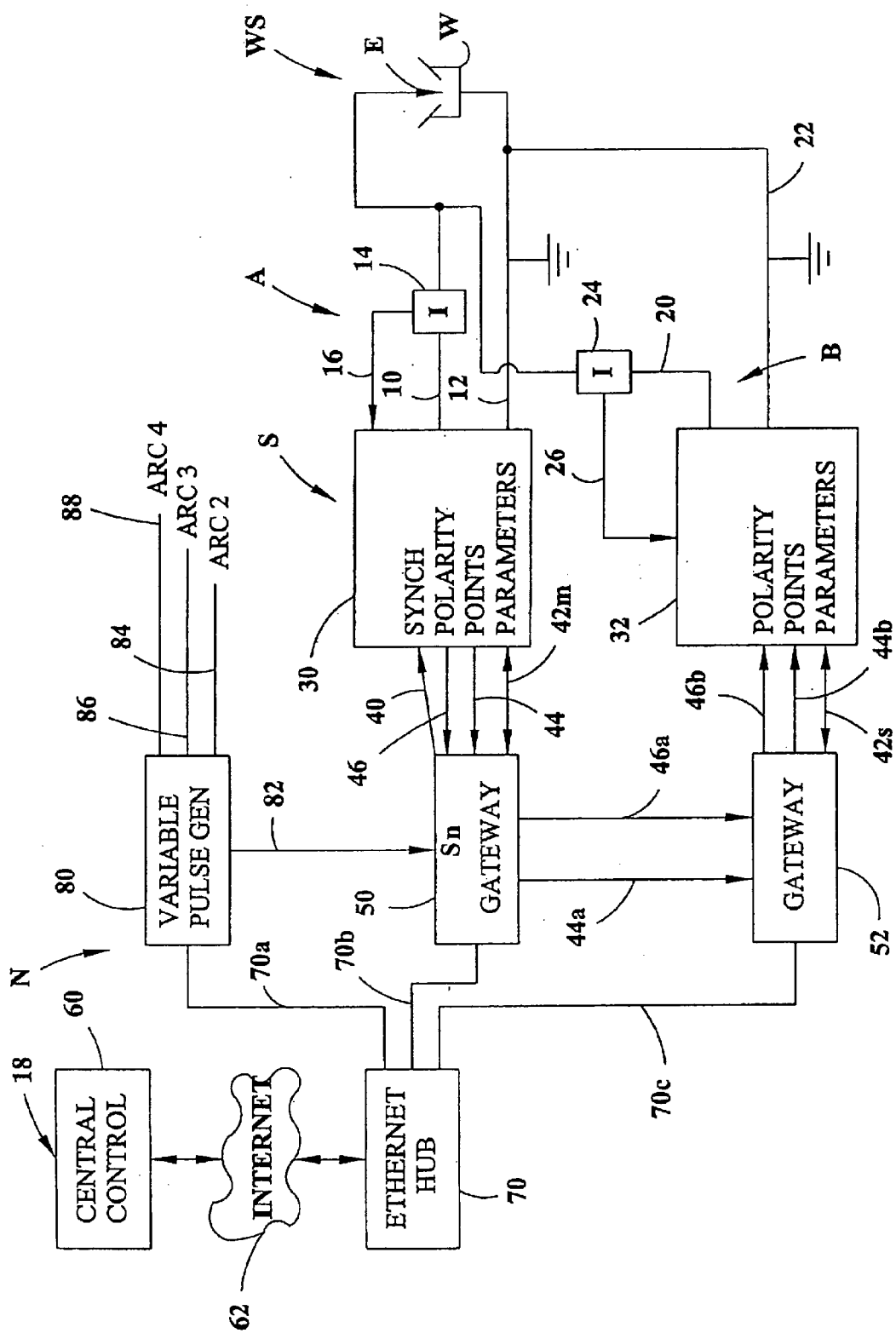
FIG. 1 is a block diagram of the preferred embodiment of the present invention.

Referring now to the drawings wherein the showings are for the purpose of illustrating a preferred embodiment of the invention only and not for the purpose of limiting same, in FIG. 1 there is a single electric arc welding system S in the form of a single cell to create an alternating current as an arc at weld station WS. This system or cell includes a first master welder A with output leads 10, 12 in series with electrode E and workpiece W in the form of a pipe seam joint or other welding operation. Hall effect current transducer 14 provides a voltage in line 16 proportional to the current of welder A. Less time critical data, such as welding parameters, are generated at a remote central control 18. In a like manner, a slave following welder B includes leads 20, 22 connected in parallel with leads 10, 12 to direct an additional AC current to the weld station WS. Hall effect current transducer 24 creates a voltage in line 26 representing current levels in welder B during the welding operation. Even though a single slave or follower welder B is shown, any number of additional welders can be connected in parallel with master welder A to produce an alternating current across electrode E and workpiece W. A novel feature is the combining of AC current at the weld station instead of prior to a polarity switching network. Each welder would include a controller and inverter based power supply illustrated as a combined master controller and power supply 30 and a slave controller and power supply 32. In accordance with the invention, controllers 30, 32 receive parameter data and synchronization data from a relatively low level logic network. The parameter information or data is power supply specific whereby each of the power supplies is provided with the desired parameters such as current, voltage and/or wire feed speed. A low level digital network can provide the parameter information; however, the advantage of the invention relates to the ability to parallel several controller and power supply units having AC output currents in a manner that the switching of the AC current for polarity reversal occurs at the same time. The "same" time indicates a time difference of less than 10 µs and preferably in the general range of 1–5 µs. To accomplish precise coordination of the AC output from power supply 30 and power supply 32, the switching points and polarity information can not be provided from a general logic network wherein the timing is less precise. Thus, in accordance with the invention, the individual AC power supplies are coordinated by high speed, highly accurate DC logic interface referred to as "gateways." As shown in FIG. 1, power supplies 30, 32 are provided with the necessary operating parameters indicated by the bidirectional leads 42m, 42s, respectively. This non-time sensitive information is provided by a digital network shown in FIG. 1 and to be described later. Master power supply 30 receives a synchronizing signal as indicated by unidirectional line 40 to time the controllers operation of its AC output current. The polarity of the AC current for power supply 30 is outputted as indicated by line 46. The actual switching command for the AC current of master power supply 30 is outputted on line 44. The switch command tells power supply S, in the form of an inverter, to "kill," which is a drastic reduction of current. In an alternative, this is actually a switch signal to reverse polarity. The "switching points" or command on line 44 preferably is a "kill" and current reversal commands utilizing the "switching points" as set forth in Stava U.S. Pat. No. 6,111,216. Thus, timed switching points or commands are outputted from power supply 30 by line 44. These switching points or commands may involve a power supply "kill" followed by a switch ready signal at a low current or merely a current reversal point. The switch "ready" is used when the "kill" concept is implemented because neither inverters are to actually reverse until they are below the set current. The polarity of the switches of controller 30 controls the logic on line 46. Slave power supply 32 receives the switching point or command logic on line 44b and the polarity logic on line 46b. These two logic signals are interconnected between the master power supply and the slave power supply through the highly accurate logic interface shown as gateway 50, the transmitting gateway, and gateway 52, the receiving gateway. These gateways are network interface cards for each of the power supplies so that the logic on lines 44b, 46b are timed closely to the logic on lines 44, 46, respectively. In practice, network interface cards or gateways 50, 52 control this logic to within 10 µs and preferably within 1–5 µs. The invention involves a low accuracy network controlling the individual power supplies for data from central control 18 through lines 42m, 42s, illustrated as provided by the gateways or interface cards. These lines contain data from remote areas (such as central control 18) which are not time sensitive and do not use the accuracy characteristics of the gateways. The highly accurate data for timing the switch reversal uses interconnecting logic signals through network interface cards 50, 52. The system in FIG. 1 is a single cell for a single AC arc.

The invention is primarily applicable for tandem electrodes wherein two or more AC arcs are created to fill the large gap found in pipe welding. Thus, the master power supply 30 receives a synchronization signal which determines the timing or phase operation of the system S for a single electrode, i.e. ARC 1.

Figure 5:
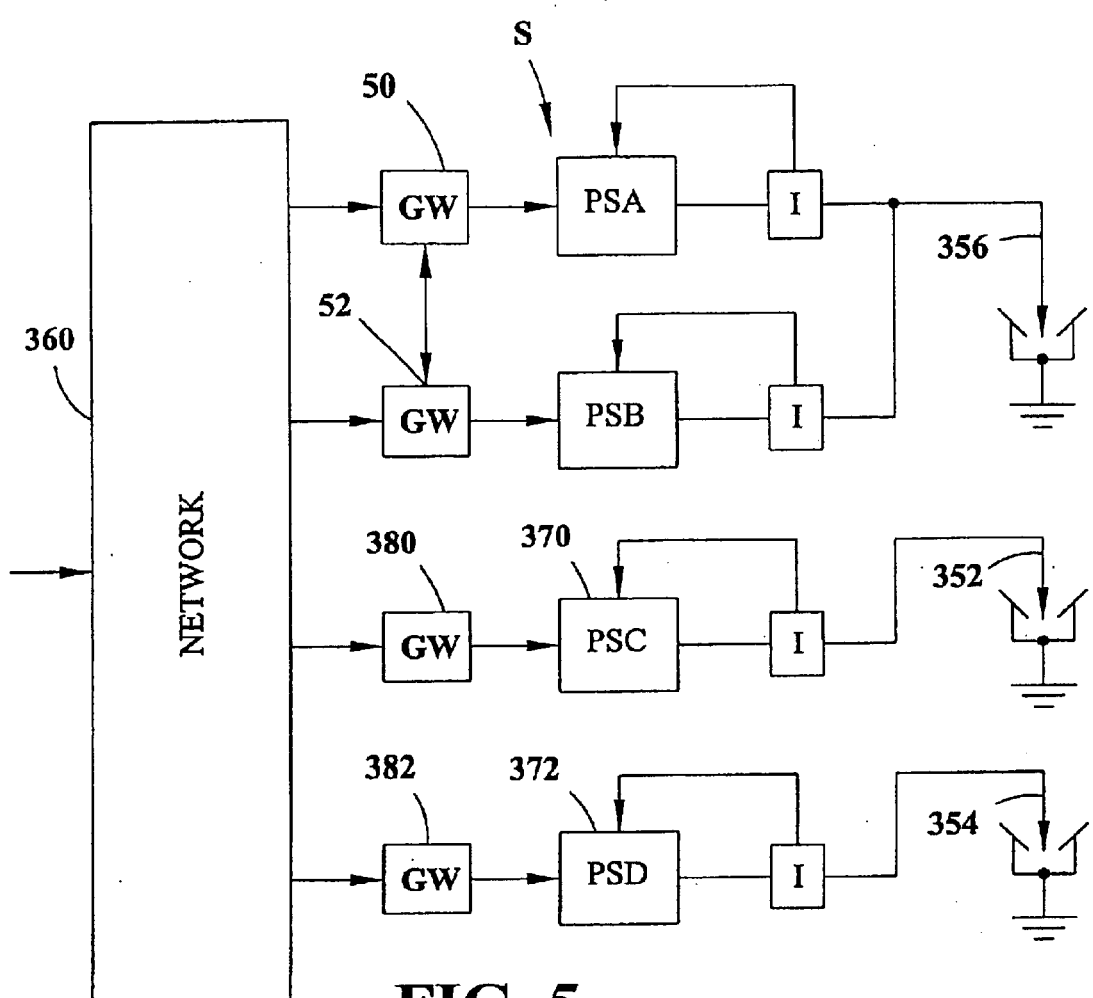
FIG. 5 is a schematic layout of the invention used to drive several tandem electrodes as shown in the pictorial view of FIG. 5A.
Figure 6:
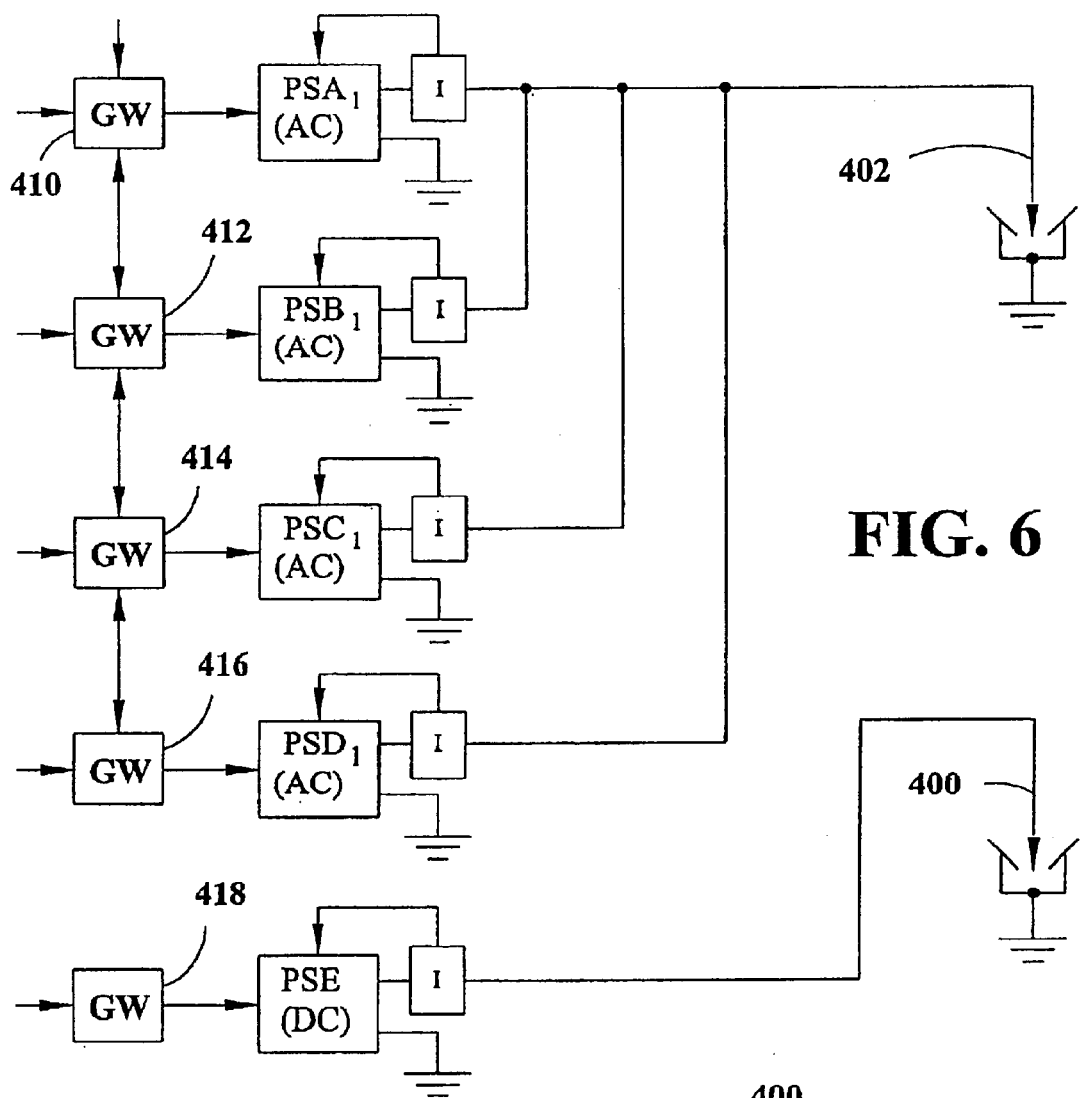
FIG. 6 is a schematic layout of the invention used for driving two tandem electrodes as shown pictorially in FIG. 6A.

System S is used with other identical systems to generate ARCs 2, 3, and 4. This concept is schematically illustrated in FIGS. 5 and 6. The synchronizing or phase setting signals are shown in FIG. 1 with only one of the tandem electrodes. An information network N comprising a central control computer and/or web server 60 provides digital information or data relating to specific power supplies in several systems or cells controlling different electrodes in a tandem operation. Internet information is directed to a local area network in the form of an ethernet network 70 having local interconnecting lines 70a, 70b, 70c. Similar interconnecting lines are directed to each power supply used in the four cells creating ARCs 1, 2, 3 and 4 of a tandem welding operation. The description of system or cell S applies to each of the arcs at the other electrodes. If AC current is employed, a master power supply is used. In some instances, merely a master power supply is used with a cell specific synchronizing signal. A single arc welding installation will not require synchronizing signals. If higher currents are required, the systems or cells include a master and slave power supply combination as described with respect to system S of FIG. 1. In some instances, a DC arc is preferred, such as the leading electrode in a tandem electrode welding operation. A DC power supply need not be synchronized, nor is there a need for accurate interconnection of the polarity logic and switching points or commands. Some DC powered electrodes may be switched between positive and negative, but not at the frequency of an AC driven electrode. Irrespective of the make-up of the arcs, ethernet or local area network 70 includes the parameter information identified in a coded fashion designated for specific power supplies of the various systems used in the tandem welding operation. This network also employs synchronizing signals for the several cells or systems whereby the systems can be offset in a time relationship. These synchronizing signals are decoded and received by a master power supply as indicated by line 40 in FIG. 1. In this manner, the AC arcs are offset on a time basis. These synchronizing signals are not required to be as accurate as the switching points through network interface cards or gateways 50, 52. Synchronizing signals on the data network are received by a network interface in the form of a variable pulse generator 80. The generator creates offset synchronizing signals in lines 84, 86 and 88. These synchronizing signals dictate the phase of the individual alternating current cells for separate electrodes in the tandem operation. Synchronizing signals can be generated by interface 80 or actually received by the generator through the network 70. In practice, network 70 merely activates generator 80 to create the delay pattern for the many synchronizing signals. Also, generator 80 can vary the frequency of the individual cells by frequency of the synchronizing pulses if that feature is desired in the tandem welding operation.

Figure 2:
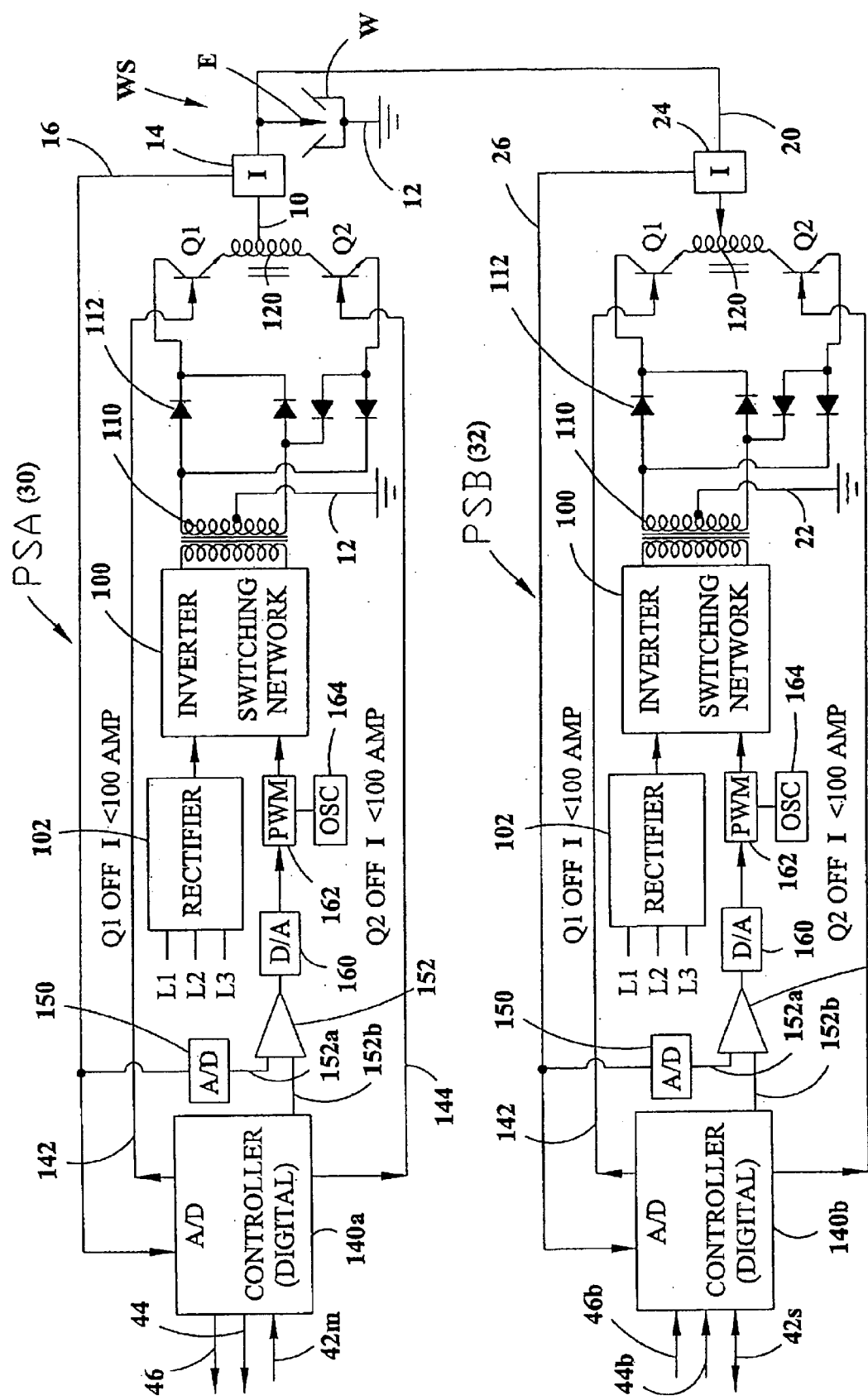
FIG. 2 is a wiring diagram of two paralleled power supplies, each of which include a switching output which power supplies are used in practicing the invention.

A variety of controllers and power supplies could be used for practicing the invention as described in FIG. 1; however, preferred implementation of the invention is set forth in FIG. 2 wherein power supply PSA is combined with controller and power supply 30 and power supply PSB is combined with controller and power supply 32. These two units are essentially the same in structure and are labeled with the same numbers when appropriate. Description of power supply PSA applies equally to power supply PSB. Inverter 100 has an input rectifier 102 for receiving three phase line current L1, L2, and L3. Output transformer 110 is connected through an output rectifier 112 to tapped inductor 120 for driving opposite polarity switches Q1, Q2. Controller 140*a* of power supply PSA and controller 140*b* of PSB are essentially the same, except controller 140*a* outputs timing information to controller 140*b*. Switching points or lines 142, 144 control the conductive condition of polarity switches Q1, Q2 for reversing polarity at the time indicated by the logic on lines 142, 144, as explained in more detail in Stava U.S. Pat. No. 6,111,216 incorporated by reference herein. The control is digital with a logic processor; thus, A/D converter 150 converts the current information on feedback line 16 or line 26 to controlling digital values for the level of output from error amplifier 152 which is illustrated as an analog error amplifier. In practice, this is a digital system and there is no further analog signal in the control architecture. As illustrated, however, amplifier has a first input 152*a* from converter 150 and a second input 152*b* from controller 140*a* or 140*b*. The current command signal on line 152*b* includes the wave shape required for the AC current across the arc at weld station WS. The output from amplifier 152 is converted to an analog voltage signal by converter 160 to drive pulse width modulator 162 at a frequency controlled by oscillator 164, which is a timer program in the processor software. This frequency is greater than 18 kHz. The total architecture of this system is digitized in the preferred embodiment of the present invention and does not include reconversion back into analog signal. This representation is schematic for illustrative purposes and is not intended to be limiting of the type of power supply used in practicing the present invention. Other power supplies could be employed.

Figure 3:
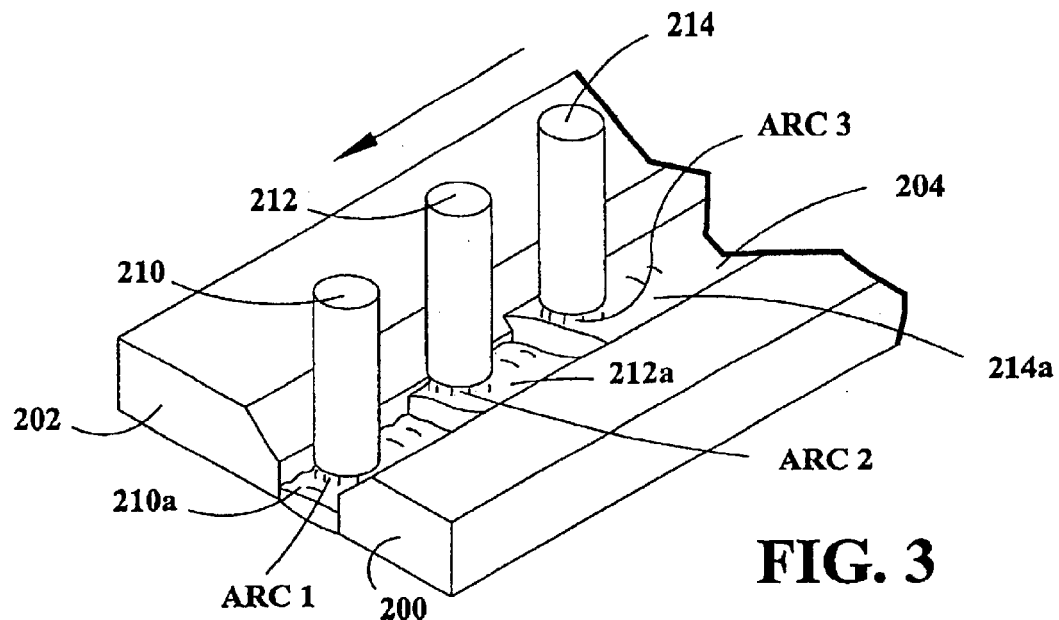
FIG. 3 is a pictorial view showing three tandem operated electrodes each of which is driven by a welding system of the present invention with the offset synchronizing signals from the information network shown in the graph of FIG. 3A and using the general schematic diagram of FIG. 3B.
Figure 3A:
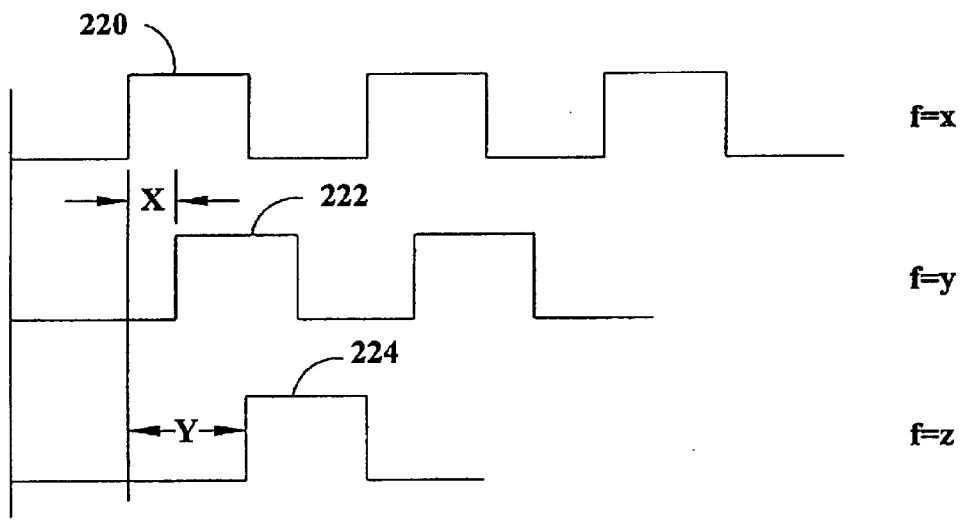
Figure 3B:
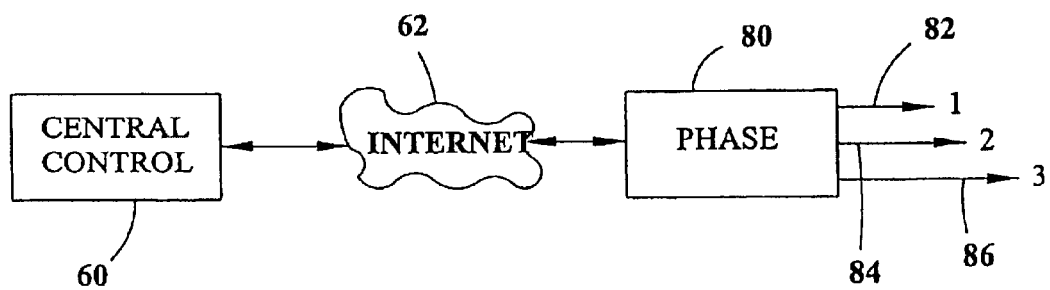

Implementation of the present invention is by driving separate electrodes in a tandem welding process with AC current creating the welding arc at the individual electrodes. Such a tandem arrangement is illustrated in FIGS. 3, 3A, and 3B wherein workpiece W is in the form of spaced edges of plates 200, 202 to define a longitudinal gap 204. Electrodes 210, 212 and 214 are melted by AC arcs to deposit beads 210*a*, 212*a* and 214*a*, respectively. Each of the arcs, 1, 2 and 3 has a different phase relationship from information received through network N as shown in FIG. 1. Specific digital synchronizing signals 220, 222 and 224 are offset by distances X and Y shown in FIG. 3A, and have frequencies x, y, and z. These frequencies may be the same or different. These electrode or cell specific synchronizing signals are communicated to the various cells from central control 60 through internet 62 to the phase generator 80, as shown in FIG. 1. The individual synchronizing pulses are directed through lines 82, 84 and 86 for controlling the timing and/or frequency of the individual welding cells for the electrodes 210, 212 and 214. In practice, the leading electrode may involve use a DC arc, which need not be synchronized. Further, the synchronizing signals 220, 222 and 224 can be in phase. Each synchronizing signal sets the timing of the individual welding systems or cells as shown in FIG. 1.

Figure 4:
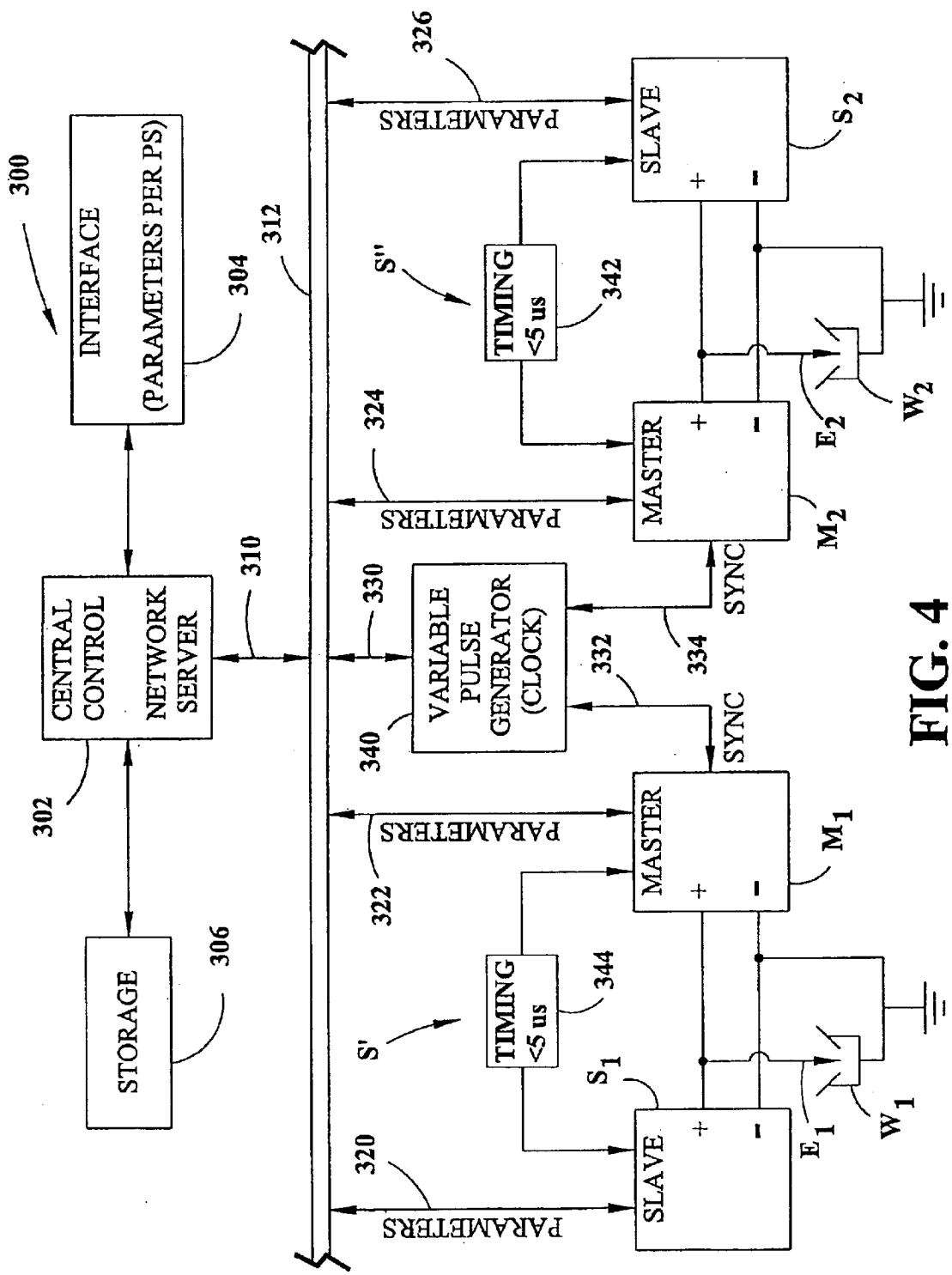
FIG. 4 is a block diagram showing in more detail the preferred embodiment of the present invention to operate two separate welding systems or cells from a single central control.

FIG. 4 shows a general layout illustrating the present invention when used for two cells S', S" or two arc formed by electrodes $E_1$ and workpiece $W_1$ and electrode $E_2$ and workpiece $W_2$. In practice, the workpieces are both identical and only the electrodes are separate; however, they do define separate arcs in the welding process. To use the present invention for the two arcs as shown in FIG. 4, network 300 includes a central control 302 to which is loaded power supply specific parameters as indicated by interface block 304. These parameters are stored as indicated by block 306 for interrogation by network 300 whenever desired. The network server is connected through internet 310 to the local area network 312 from which weld parameters are loaded into the individual control and power supply combinations $M_1$, $S_1$, $M_2$, and $S_2$ through interconnections illustrated as lines 320–326. In a like manner, the synchronizing signals for the individual systems S', S" are available on network 312 and are communicated as illustrated as line 330 with the pulse generator or clock 340. The output of the generator is represented as synchronizing data lines 332, 334 for individually controlling the delay or synchronization of systems S', S". This dictates the time relationship between the two arcs of the dual electrode system shown in FIG. 4. Cell S' includes master power supply $M_1$ connected in parallel with slave power supply $S_1$. In a like manner, system S" includes master $M_2$ connected in parallel with the output of slave power supply $S_2$. Network interface cards 342, 344 communicate the timing from the master to the slave and directs the polarity logic as indicated with respect to the disclosure shown in FIG. 1. In this manner, two separate electrodes used in tandem are driven separately with the parameters and synchronizing signals being directed through a network which can include an internet link. Actual implementation of a timing block control is located inside the master control board. The interface card S', S" translates and isolates the signals between the master control and the slave control.

Figure 5A:
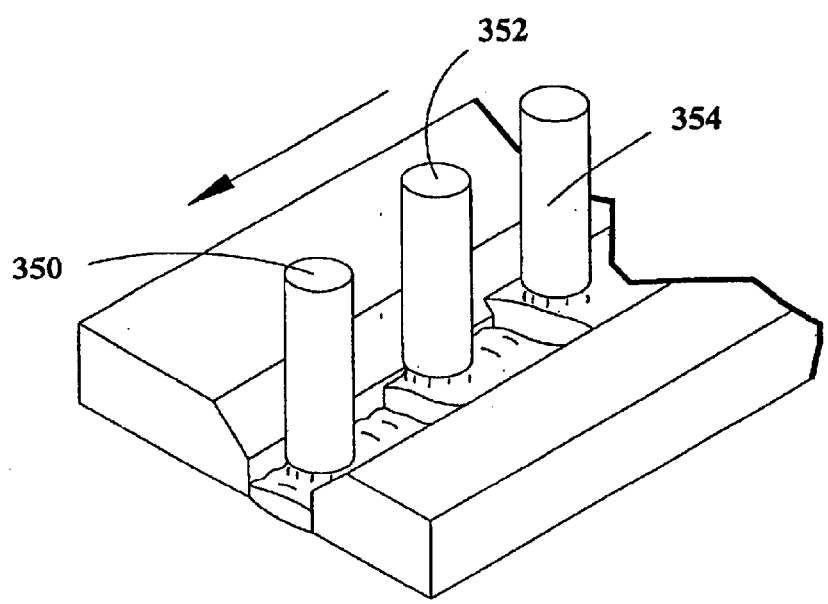
Figure 6A:
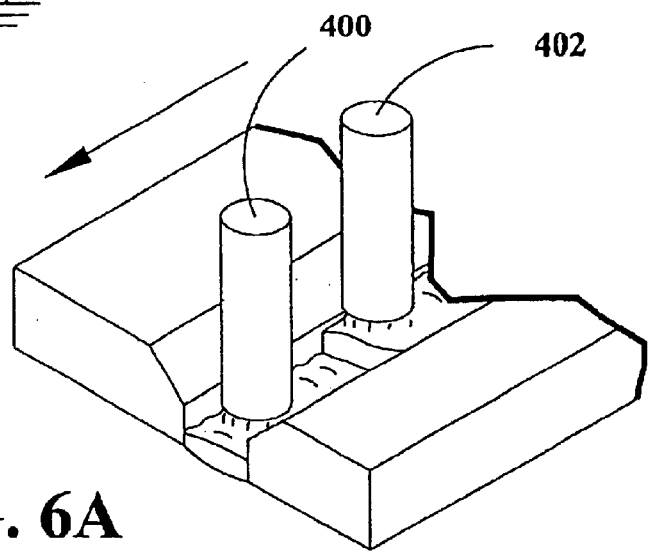

The invention can be expanded to include any number of electrodes. Three electrodes 350, 352 and 354 are shown in FIGS. 5 and 5A. Network 360 as previously described communicates with system S shown in FIG. 1 together with two additional systems 370, 372. Network 360 controls the logic to and through gateways 50 and 52 shown in FIG. 1 together with similar gateways 380 and 382 for systems 370, 372, respectively. This embodiment of the invention illustrates two power supplies PSA and PSB for providing synchronized and timed AC current through one electrode 356. Electrode 352 is connected with network 360 by gateway 380 so power supply PSC uses only a single master to produce an AC current for electrode 352. Electrode 354 is driven by power supply PSD which is a DC power supply without output polarity switches and is driven through gateway 382 by network 360. Other arrangements are used to construct architecture of different tandem electrodes process. For instance, two electrodes 400, 402 are shown in the layout of FIGS. 6 and 6A. Four separate power supplies $PSA_1$, $PSB_1$, $PSC_1$, and $PSD_1$ are connected in parallel to produce an AC current across electrode 402. Power supply PSE is a DC power supply without output polarity switches. All of the power supplies are provided with individual gateways or network interface cards 410, 412, 414, 416 and 418, respectively. Each of the gateways receives parameters for the individual power supplies. Gateways 410–416 are interconnected to assure that the timing and polarity of the switches in the first four power supplies are correlated accurately. Although gateways 414, 416 are indicated to be driven in series with gateway 412, in practice, they are driven directly from the output of gateway 410 in parallel fashion. This prevents the stacking of timing differences in the individual gateways.

Figure 7:
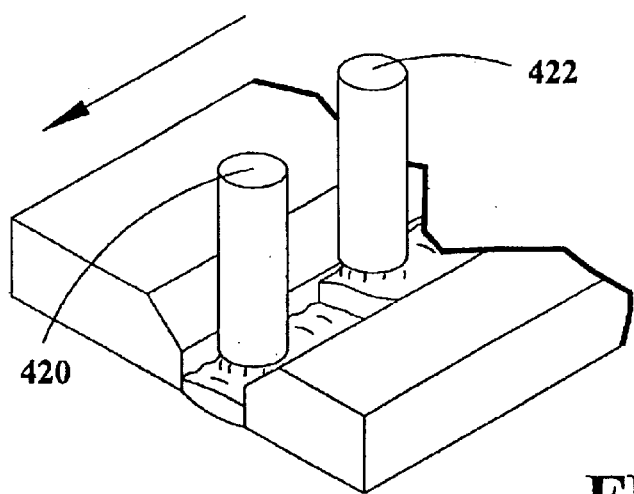
FIG. 7 is a pictorial view showing two tandem mounted electrodes operated by offset switching operation shown in the graphs of FIG. 7A using the switch point concept of Stava U.S. Pat. No. 6,111,216; and, FIG. 8 is a schematic layout of the software program to cause switching of the paralleled power supplies as soon as the coordinated switch commands have been processed and the next coincident signal has been created.
Figure 7A:
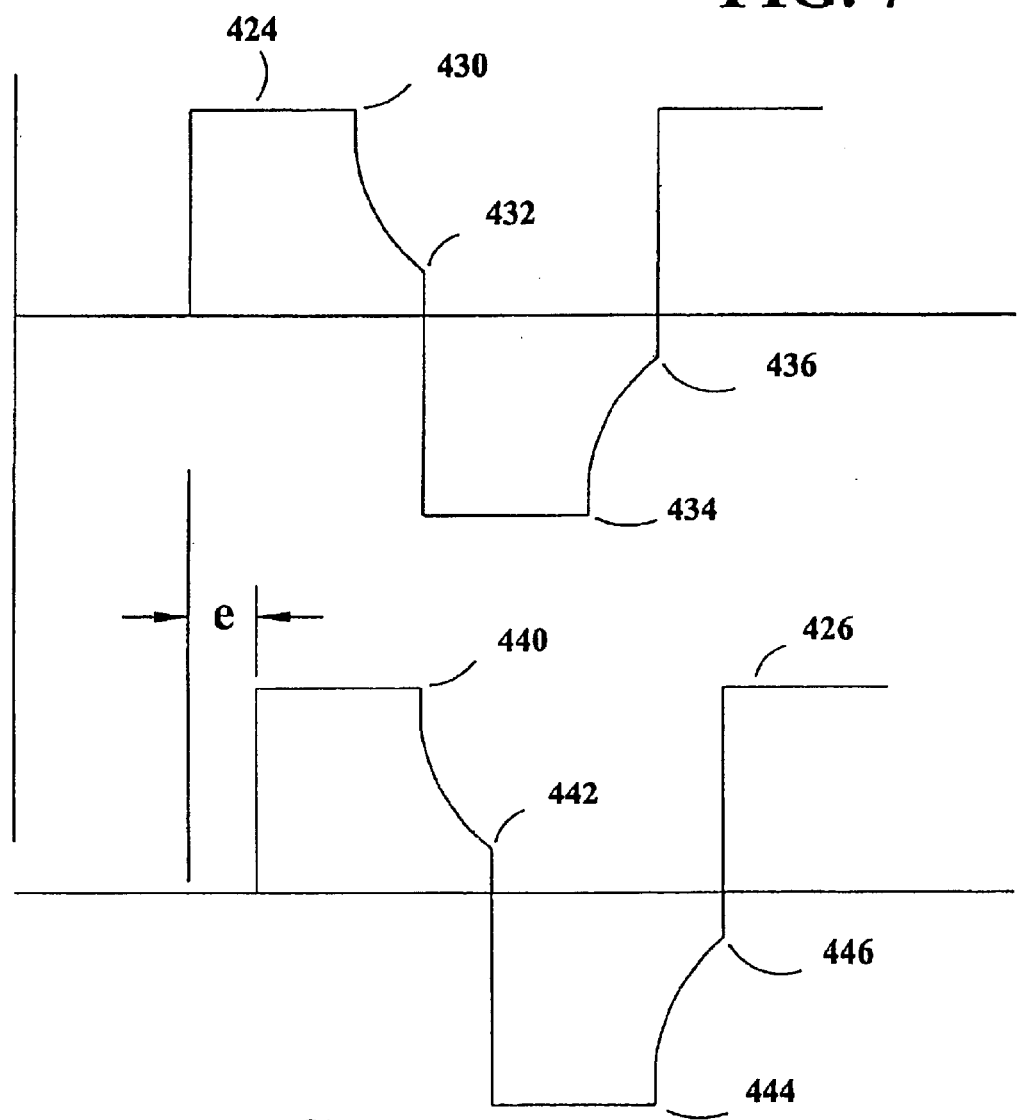

As indicated, the switching points of the master and slave power supplies are really a switching sequence wherein the inverter is first turned off and then the switches are reversed to change the polarity after the power supply reaches a low current. When the inverter is turned off, the current is reduced. Then reversal of polarity is effected. This concept is shown in Stava U.S. Pat. No. 6,111,216. This patented switching technique is disclosed in FIGS. 7 and 7A, wherein two electrodes 420, 422 having AC current curves schematically illustrated as curve 424 and curve 426. In curve 424, the power supply is turned off at point 430. The current decays to a low current level 432 at which time there is a reversal to a negative polarity. This negative current level is maintained until the desired parameter has been reached. The power supply is then turned off at point 434 and the negative current pulse decays to switch point 436 at which time the switches reverse to a positive polarity. With a master and one or more slave power supplies, it is necessary to coordinate the kill points 430, 434, as well as the switch points or times 432, 436. For simplicity, this polarity reversal sequence is referred to as the "switching time." Curve 426 is offset by the distance e and is provided by one or more power supplies connected in series. This curve has power supply kill point 440 and kill point 444. The switching points 442, 446 correspond with the current reversal switching points 432, 436. Even though the technique set forth in FIG. 7A is preferred, a direct current reversal at the switching points is also used with the present invention. In that instance, the switches must be larger and require a snubber network or a larger snubber network in parallel with the switches.

As indicated, when the master controller is to switch, a switch command is issued to the master controller. This causes a "kill" signal to be received by the master so a kill signal and polarity logic is rapidly transmitted to the controller of one or more slave power supplies connected in parallel with a single electrode. If standard AC power supplies are used with large snubbers in parallel with the polarity switches, the slave controller or controllers are immediately switched within 1–10 µs after the master power supply receives the switch command. This is the advantage of the high accuracy interface cards or gateways. In practice, the actual switching for current reversal of the paralleled power supplies is not to occur until the output current is below a given value, i.e. about 100 amperes. This allows use of smaller switches.

Figure 8:
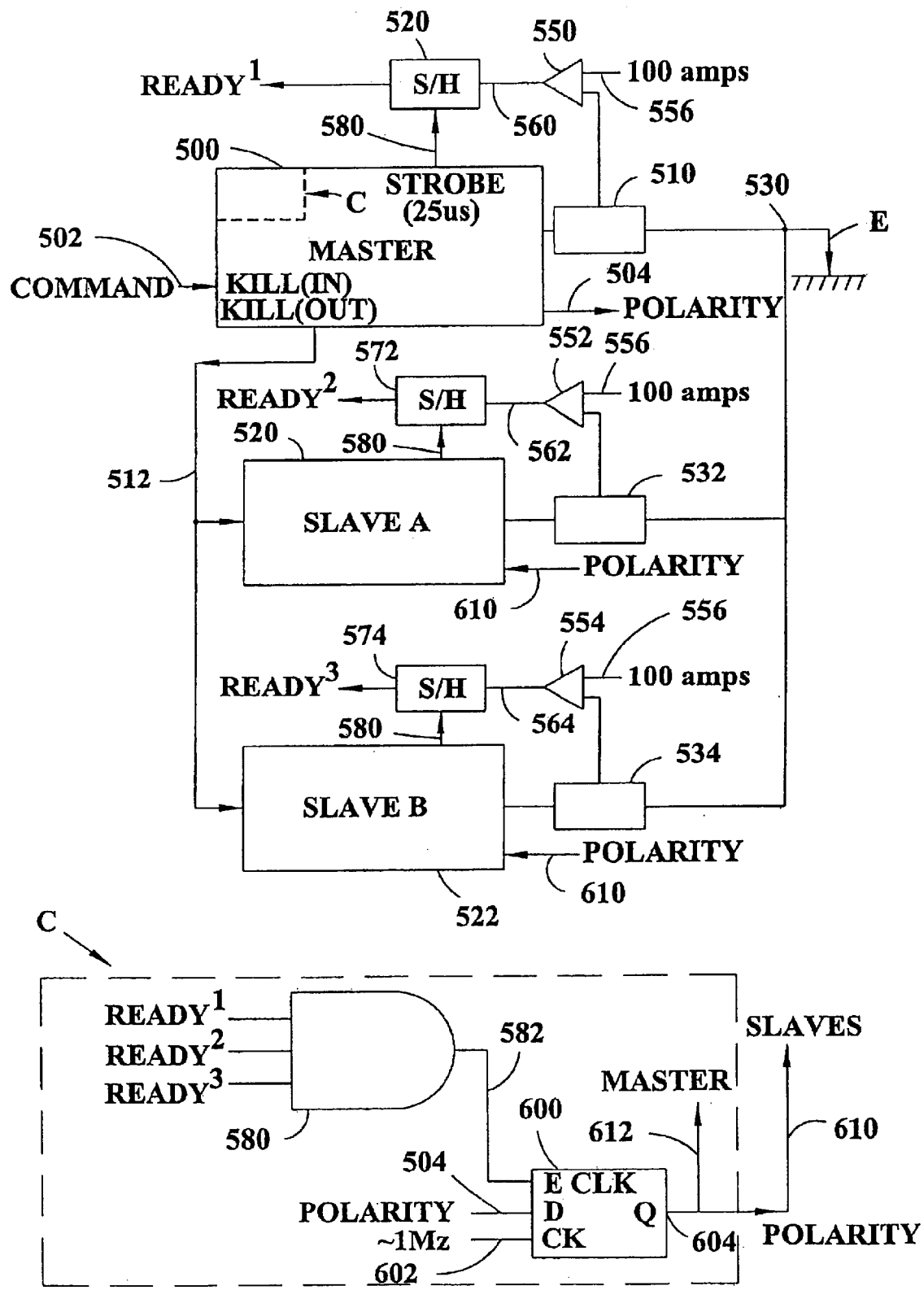

The implementation of the invention using this delayed switching technique requires the actual switch only after all power supplies are below the given low current level. The delay process is accomplished in the software of the digital processor and is illustrated by the schematic layout of FIG. 8. When the controller of master power supply 500 receives a command signal as represented by line 502, the power supply starts the switching sequence. The master outputs a logic on line 504 to provide the desired polarity for switching of the slaves to correspond with polarity switching of the master. In the commanded switch sequence, the inverter of master power supply 500 is turned off or down so current to electrode E is decreased as read by hall effect transducer 510. The switch command in line 502 causes an immediate "kill" signal as represented by line 512 to the controllers of paralleled slave power supplies 520, 522 providing current to junction 530 as measured by hall effect transducers 532, 534. All power supplies are in the switch sequence with inverters turned off or down. Software comparator circuits 550, 552, 554 compare the decreased current to a given low current referenced by the voltage on line 556. As each power supply decreases below the given value, a signal appears in lines 560, 562, and 564 to the input of a sample and hold circuits 570, 572, and 574, respectively. The circuits are outputted by a strobe signal in line 580 from each of the power supplies. When a set logic is stored in a circuit 570, 572, and 574, a YES logic appears on lines READY[1], READY[2], and READY[3] at the time of the strobe signal. This signal is generated in the power supplies and has a period of 25 µs; however, other high speed strobes could be used. The signals are directed to controller C of the master power supply, shown in dashed lines in FIG. 8. A software ANDing function represented by AND gate 580 has a YES logic output on line 582 when all power supplies are ready to switch polarity. This output condition is directed to clock enable terminal ECLK of software flip flop 600 having its D terminal provided with the desired logic of the polarity to be switched as appearing on line 504. An oscillator or timer operated at about 1 MHz clocks flip flop by a signal on line 602 to terminal CK. This transfers the polarity command logic on line 504 to a Q terminal 604 to provide this logic in line 610 to switch slaves 520, 522 at the same time the identical logic on line 612 switches master power supply 500. After switching, the polarity logic on line 504 shifts to the opposite polarity while master power supply awaits the next switch command based upon the switching frequency. Other circuits can be used to effect the delay in the switching sequence; however, the illustration in FIG. 8 is the present scheme.

The interface timing is disclosed as less than 10 µs. This value is to be substantially more accurate than the ethernet accuracy. Thus, it can be as high as about 100 µs and still provide an advantage. But, coordinated switching is facilitated with an accuracy of less than about 10 µs with a READY strobe at 25 µs. Each power supply is ready to switch polarity before the switch command is generated. One can reduce before the ready current and then come back up while the other is reducing to the ready current. The key is accurate control and switching at low current. In addition, the power supplies could be back-to-back reverse polarity choppers with the positive state of the reverse polarity chopper switch by the accurate interface. A back-to-back AC chopper power supply is shown in prior U.S. application Ser. No. 09/575,264, filed May 22, 2000 and incorporated by reference herein.

Having thus defined the invention, the following is claimed:

1. A power supply system for creating a first AC signal and a second AC signal, said system comprising:
   a first system for creating said first AC signal with at least two power supplies operated at a first synchronized time determined by a first synchronized signal with first operation parameters and a high accuracy interconnection interface between said power supplies of said first system to correlate polarity switching of said power supplies of said first system;
   wherein each power supply in said first system includes:
      a center tapped inductor with a first portion creating a first polarity where said first AC signal is positive and a second portion creating a second polarity where said first AC signal is negative;
      a first switch for routing said first AC signal through said first portion of said inductor; and
      a second switch for routing said first AC signal through said second portion of said inductor; and
   a second system for creating said second AC signal with at least two power supplies operated at a second synchronized time determined by a second synchronize signal offset from said first synchronize signal with second operation parameters and a high accuracy interconnection interface between said power supplies of said second system to correlate polarity switching of said power supplies of said second system;
   wherein each power supply in said second system includes:
      a center tapped inductor with a first portion creating a first polarity where said second AC signal is positive and a second portion creating a second polarity where said second AC signal is negative;
      a first switch for routing said second AC signal through said first portion of said inductor; and
      a second switch for routing said second AC signal through said second portion of said inductor.

2. The power supply system set forth in claim 1, further comprising:
   a low accuracy information network connected to said first and second systems and containing digital signals including said first and second operational parameters and digitized first and second synchronize signals.

3. A power supply system for creating a first AC signal and a second AC signal, said system comprising:
   a first system for creating said first AC signal with at least two power supplies operated at a first synchronized time determined by a first synchronized signal with first operation parameters and a high accuracy interconnection interface between said power supplies of said first system to correlate polarity switching of said power supplies of said first system;
   wherein each power supply in said first system includes an output switching network, the output switching network comprising:
      a first switch in series with a first inductor segment creating a first polarity associated with said first AC signal that is positive when said first switch is turned on;
      a second switch in series with a second inductor segment creating a second polarity associated with said first AC signal that is negative when said second switch is turned on; and
   control means for alternately turning said first switch on and said second switch off at a first switch reversing point and turning said second switch on and said first switch off at a second switch reversing point to create at least a portion of the first AC signal; and
   a second system for creating said second AC signal with at least two power supplies operated at a second synchronized time determined by a second synchronize signal offset from said first synchronize signal with second operation parameters and a high accuracy interconnection interface between said power supplies of said second system to correlate polarity switching of said power supplies of said second system;
   wherein each power supply in said second system includes an output switching network, the output switching network comprising:
      a first switch in series with a first inductor segment creating a first polarity associated with said second AC signal that is positive when said first switch is turned on;
      a second switch in series with a second inductor segment creating a second polarity associated with said second AC signal that is negative when said second switch is turned on; and
   control means for alternately turning said first switch on and said second switch off at a first switch reversing point and turning said second switch on and said first switch off at a second switch reversing point to create at least a portion of the second AC signal.

4. The power supply system set forth in claim 3, further comprising:
   a low accuracy information network connected to said first and second systems and containing digital signals including said first and second operational parameters and digitized first and second synchronize signals.

5. The power supply system set forth in claim 3 wherein said inductor segments of each power supply are a part of a single inductor within each corresponding power supply.

6. An electric arc welding system for creating an AC welding arc between an electrode and a workpiece, said system comprising:
   a first power supply to create a first AC current with first weld parameters between said electrode and workpiece by generating a first switch controlling signal reversing polarity of said first current at a specific switch time; and
   a second power supply to create a second AC current with second weld parameters between said electrode and workpiece by a second switch controlling signal reversing polarity of said second current at a switch time near said specific switch time;
   wherein the first and second power supplies each include:
      a center tapped inductor with a first portion creating a first polarity where said corresponding AC current is positive and a second portion creating a second polarity where said corresponding AC current is negative;

a first switch for routing said corresponding AC current through said first portion of said inductor; and a second switch for routing said corresponding AC current through said second portion of said inductor.

7. The electric arc welding system set forth in claim 6, further comprising:

a timing interface between said first and second power supplies to create said second signal in relation to said first signal.

8. The electric arc welding system set forth in claim 6, further comprising:

a timing interface between said first and second power supplies to create said second signal by said first signal where said switch time of said second power supply is within about 5 µs of said specific switch time.

9. An electric arc welding system for creating an AC welding arc between an electrode and a workpiece, said system comprising:

a first power supply to create a first AC current with first weld parameters between said electrode and workpiece by generating a first switch controlling signal reversing polarity of said first current at a specific switch time; and a second power supply to create a second AC current with second weld parameters between said electrode and workpiece by a second switch controlling signal reversing polarity of said second current at a switch time near said specific switch time;

wherein the first and second power supplies each include an output switching network, the output switching network comprising:

a first switch in series with a first inductor segment creating a first polarity associated with said corresponding AC current that is positive when said first switch is turned on;

a second switch in series with a second inductor segment creating a second polarity associated with said corresponding AC current that is negative when said second switch is turned on; and control means for alternately turning said first switch on and said second switch off at a first switch reversing point and turning said second switch on and said first switch off at a second switch reversing point to create the corresponding AC current.

10. The electric arc welding system set forth in claim 9, further comprising:

a timing interface between said first and second power supplies to create said second signal in relation to said first signal.

11. The electric arc welding system set forth in claim 9, further comprising:

a timing interface between said first and second power supplies to create said second signal by said first signal where said switch time of said second power supply is within about 5 µs of said specific switch time.

12. The electric arc welding system set forth in claim 9 wherein said inductor segments of each first and second power supply are a part of a single inductor within each corresponding power supply.

13. An electric arc welding system for creating an AC welding arc between an electrode and a workpiece, said system comprising:

a first power supply to create a first AC current with first weld parameters between said electrode and workpiece by generating a first switch signal for reversing polarity of said first current at a specific time; and a second power supply to create a second AC current with second weld parameters between said electrode and workpiece by a second switch signal for reversing polarity of said second current at a given time;

wherein the first and second power supplies each include:

a center tapped inductor with a first portion creating a first polarity where said corresponding AC current is positive and a second portion creating a second polarity where said corresponding AC current is negative;

a first switch for routing said corresponding AC current through said first portion of said inductor; and a second switch for routing said corresponding AC current through said second portion of said inductor.

14. The electric arc welding system set forth in claim 13, further comprising:

a timing interface between said first and second power supplies to create said second signal by said first signal.

15. The electric arc welding system set forth in claim 14, further comprising:

a circuit to switch said power supplies after said first and second signal.

16. The electric arc welding system set forth in claim 15, said circuit comprising:

a detector to switch said power supplies when the current of said power supplies is less than a given amount.

17. The electric arc welding system set forth in claim 13, further comprising:

a timing interface between said first and second power supplies to create said second signal by said first signal where said given time of said second power supply is within about 10 µs of said specific time of said first power supply.

18. An electric arc welding system for creating an AC welding arc between an electrode and a workpiece, said system comprising:

a first power supply to create a first AC current with first weld parameters between said electrode and workpiece by generating a first switch signal for reversing polarity of said first current at a specific time; and a second power supply to create a second AC current with second weld parameters between said electrode and workpiece by a second switch signal for reversing polarity of said second current at a given time;

wherein the first and second power supplies each include an output switching network, the output switching network comprising:

a first switch in series with a first inductor segment creating a first polarity associated with said corresponding AC current that is positive when said first switch is turned on;

a second switch in series with a second inductor segment creating a second polarity associated with said corresponding AC current that is negative when said second switch is turned on; and control means for alternately turning said first switch on and said second switch off at a first switch reversing point and turning said second switch on and said first switch off at a second switch reversing point to create the corresponding AC current.

19. The electric arc welding system set forth in claim 18, further comprising:

a timing interface between said first and second power supplies to create said second signal by said first signal.

20. The electric arc welding system set forth in claim 19, further comprising:
a circuit to switch said power supplies after said first and second signal.

21. The electric arc welding system set forth in claim 20, said circuit comprising:
a detector to switch said power supplies when the current of said power supplies is less than a given amount.

22. The electric arc welding system set forth in claim 18, further comprising:
a timing interface between said first and second power supplies to create said second signal by said first signal where said given time of said second power supply is within about 10 $\mu$s of said specific time of said first power supply.

23. The electric arc welding system set forth in claim 18 wherein said inductor segments of each first and second power supply are a part of a single inductor within each corresponding power supply.

24. An electric arc welding system for creating an AC welding arc between an electrode and a workpiece, said system comprising:
a first power supply to create a first AC current with first weld parameters between said electrode and workpiece by generating a first switch controlling signal reversing polarity of said first current at a specific active switch time; and
a second power supply to create a second AC current with second weld parameters between said electrode and workpiece by a second switch controlling signal reversing polarity of said second current at a switch activate time;
wherein the first and second power supplies each include:
a center tapped inductor with a first portion creating a first polarity where said corresponding AC current is positive and a second portion creating a second polarity where said corresponding AC current is negative;
a first switch for routing said corresponding AC current through said first portion of said inductor; and
a second switch for routing said corresponding AC current through said second portion of said inductor.

25. The electric arc welding system set forth in claim 24, further comprising:
a timing interface between said first and second power supplies to create said second signal by said first signal where said first and second signals are within about 10 $\mu$s.

26. The electric arc welding system set forth in claim 24, further comprising:
a timing interface between said first and second power supplies to create said second signal by said first signal.

27. The electric arc welding system set forth in claim 26, further comprising:
a circuit to switch said power supplies after said first and second signal.

28. The electric arc welding system set forth in claim 27, said circuit comprising:
a detector to switch said power supplies when the current of said power supplies is less than a given amount.

29. An electric arc welding system for creating an AC welding arc between an electrode and a workpiece, said system comprising:
a first power supply to create a first AC current with first weld parameters between said electrode and workpiece by generating a first switch controlling signal reversing polarity of said first current at a specific active switch time; and
a second power supply to create a second AC current with second weld parameters between said electrode and workpiece by a second switch controlling signal reversing polarity of said second current at a switch activate time;
wherein the first and second power supplies each include an output switching network, the output switching network comprising:
a first switch in series with a first inductor segment creating a first polarity associated with said corresponding AC current that is positive when said first switch is turned on;
a second switch in series with a second inductor segment creating a second polarity associated with said corresponding AC current that is negative when said second switch is turned on; and
control means for alternately turning said first switch on and said second switch off at a first switch reversing point and turning said second switch on and said first switch off at a second switch reversing point to create the corresponding AC current.

30. The electric arc welding system set forth in claim 29, further comprising:
a timing interface between said first and second power supplies to create said second signal by said first signal where said first and second signals are within about 10 $\mu$s.

31. The electric arc welding system set forth in claim 29, further comprising:
a timing interface between said first and second power supplies to create said second signal by said first signal.

32. The electric arc welding system set forth in claim 31, further comprising:
a circuit to switch said power supplies after said first and second signal.

33. The electric arc welding system set forth in claim 32, said circuit comprising:
a detector to switch said power supplies when the current of said power supplies is less than a given amount.

34. The electric arc welding system set forth in claim 29 wherein said inductor segments of each first and second power supply are a part of a single inductor within each corresponding power supply.

35. An electric welder, comprising:
a first power source with a first output polarity changing switch network creating a first AC output with first output leads connected across an electrode and a workpiece; and
a second power source with a second output polarity changing switch network creating a second AC output with second output leads connected across said electrode and workpiece in parallel with said first leads;
wherein the first and second output polarity changing switch networks each include:
a center tapped inductor with a first portion creating a first polarity where said corresponding AC output is positive and a second portion creating a second polarity where said corresponding AC output is negative;
a first switch for routing said corresponding AC output through said first portion of said inductor; and
a second switch for routing said corresponding AC output through said second portion of said inductor.

36. The electric arc welding system set forth in claim 35 wherein the current from said power sources is added.

37. An electric welder, comprising:

a first power source with a first output polarity changing switch network creating a first AC output with first output leads connected across an electrode and a workpiece; and a second power source with a second output polarity changing switch network creating a second AC output with second output leads connected across said electrode and workpiece in parallel with said first leads;

wherein the first and second output polarity changing switch networks each include:

a first switch in series with a first inductor segment creating a first polarity associated with said corresponding AC output that is positive when said first switch is turned on;

a second switch in series with a second inductor segment creating a second polarity associated with said corresponding AC output that is negative when said second switch is turned on; and control means for alternately turning said first switch on and said second switch off at a first switch reversing point and turning said second switch on and said first switch off at a second switch reversing point to create the corresponding AC output.

38. The electric arc welding system set forth in claim 37 wherein the current from said power sources is added.

39. The electric arc welding system set forth in claim 37 wherein said inductor segments of each first and second output polarity changing switch network are a part of a single inductor within each corresponding output polarity changing switch network.

* * * * *